United States Patent [19]

Garnsey

[11] Patent Number: 4,603,658
[45] Date of Patent: Aug. 5, 1986

[54] COLLAPSIBLE STRUCTURE

[76] Inventor: Roger L. Garnsey, 1003 E. Fifth Ave., Monmouth, Ill. 61462

[21] Appl. No.: 676,083

[22] Filed: Nov. 29, 1984

[51] Int. Cl.⁴ .................. E04B 1/343; A01K 1/00
[52] U.S. Cl. .................................... 119/19; 52/70
[58] Field of Search ............. 119/19; 52/69, 70, 71; 135/106, 109, 113

[56] References Cited

U.S. PATENT DOCUMENTS

| | | | |
|---|---|---|---|
| 2,445,055 | 7/1948 | Capaul | 52/69 |
| 3,043,264 | 7/1962 | Felhofer et al. | 119/19 |
| 3,280,796 | 10/1966 | Hatcher | 119/19 |
| 3,807,104 | 4/1974 | Webster | 52/70 |
| 4,109,427 | 8/1978 | O'Brian et al. | 119/19 X |
| 4,391,223 | 7/1983 | Holland et al. | 119/19 |
| 4,467,572 | 8/1984 | Somers et al. | 52/70 |

Primary Examiner—Robert P. Swiatek
Attorney, Agent, or Firm—Kalish & Gilster

[57] ABSTRACT

A collapsible, easily relocatable structure useable for various different purposes but illustrated as an animal shelter for dogs and other animals such shelter has saddle-type, gabled roof joined to side wall panels and formed of opposed, flat sloping roof panels hingedly to the respective side wall panels and hingedly secured centrally at the roof ridge. A floor is formed of flat panels hingedly joined to the side wall panels and hingedly secured centrally. Opposite ends are each formed of a pair of flat end panels hingedly secured to the side wall panels having an opening for ingress and egress of an animal. The shelter is collapsible by outward folding of the roof and floor panels and inward folding of the end panels. A cord arrangement locks the panels in unfolded configuration for maintaining the shelter in an erected condition.

12 Claims, 8 Drawing Figures

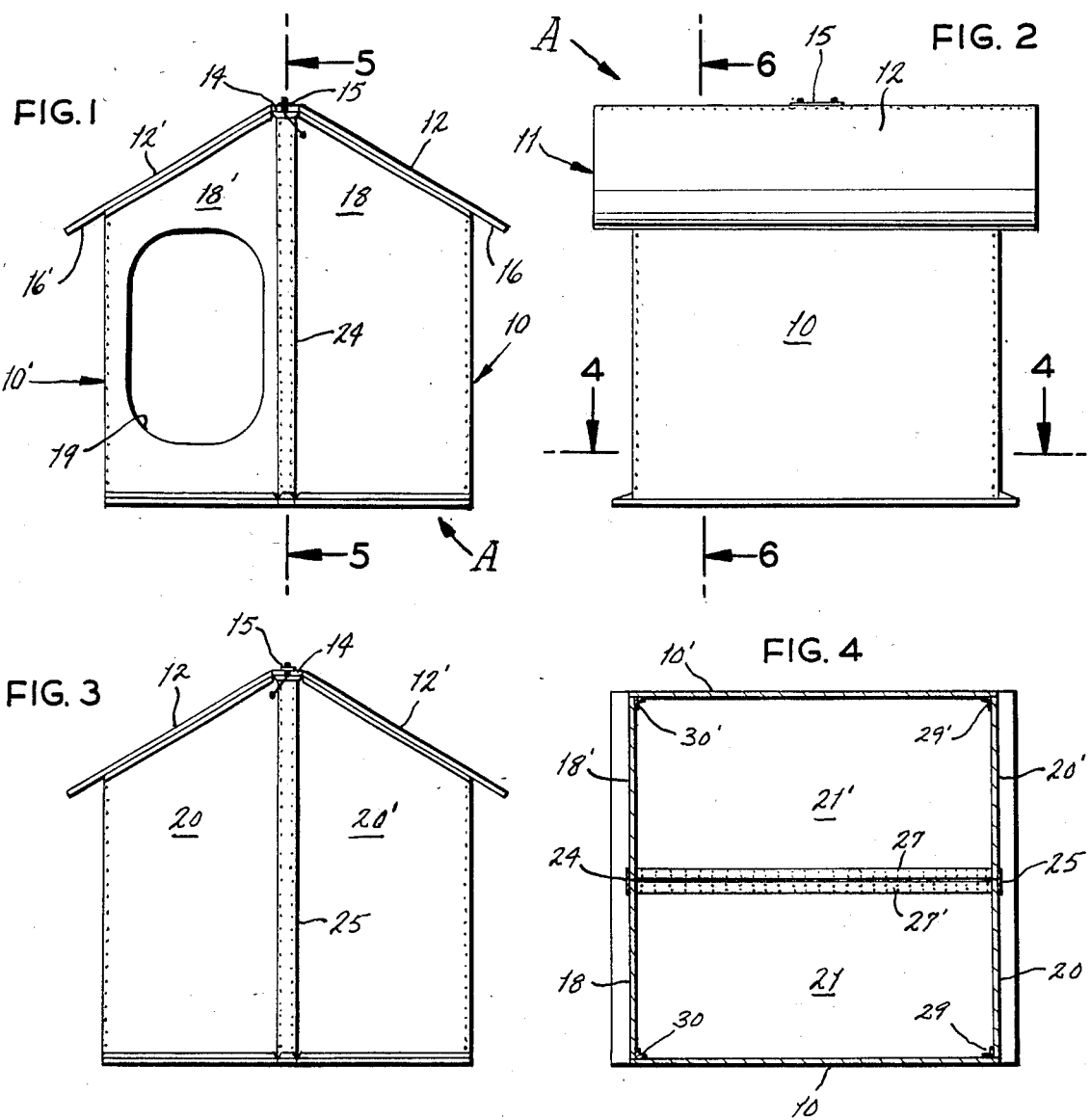
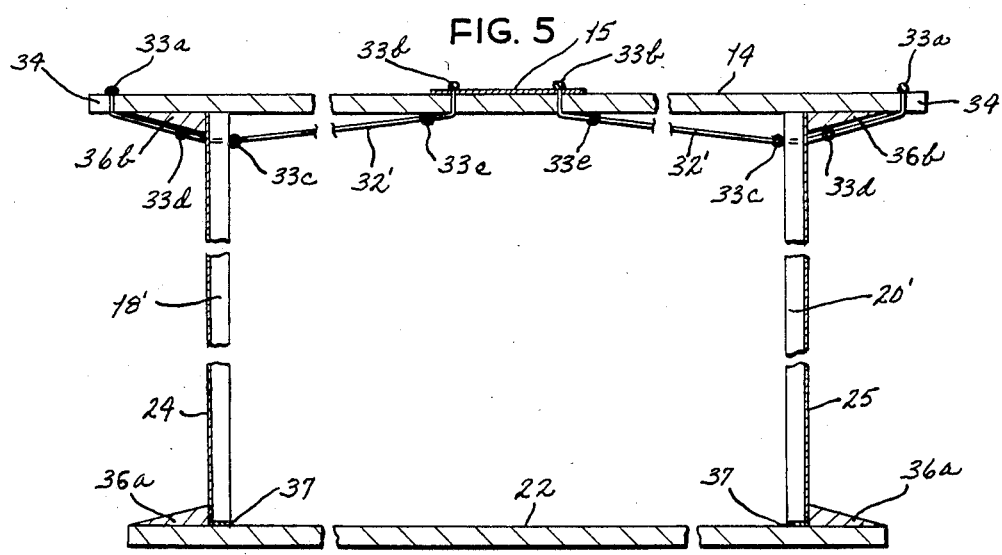

U.S. Patent   Aug. 5, 1986   Sheet 2 of 2   4,603,658
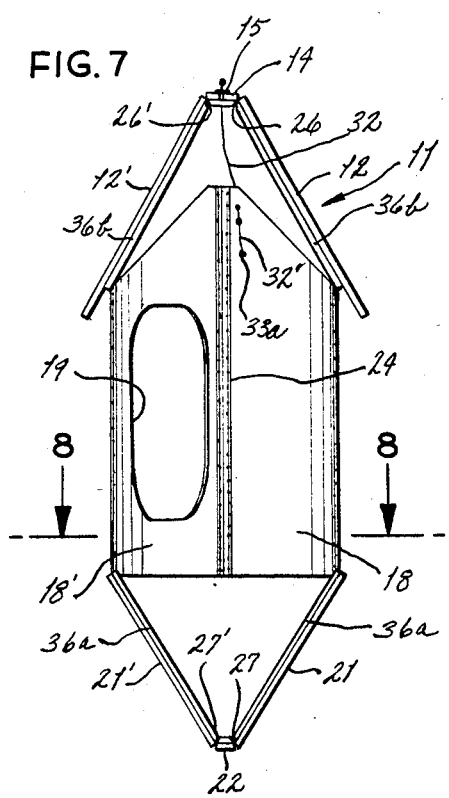
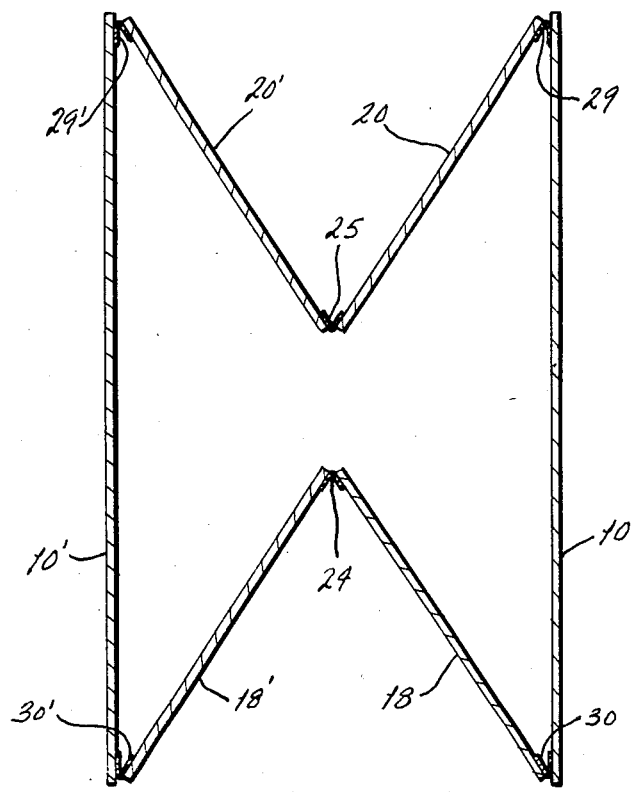
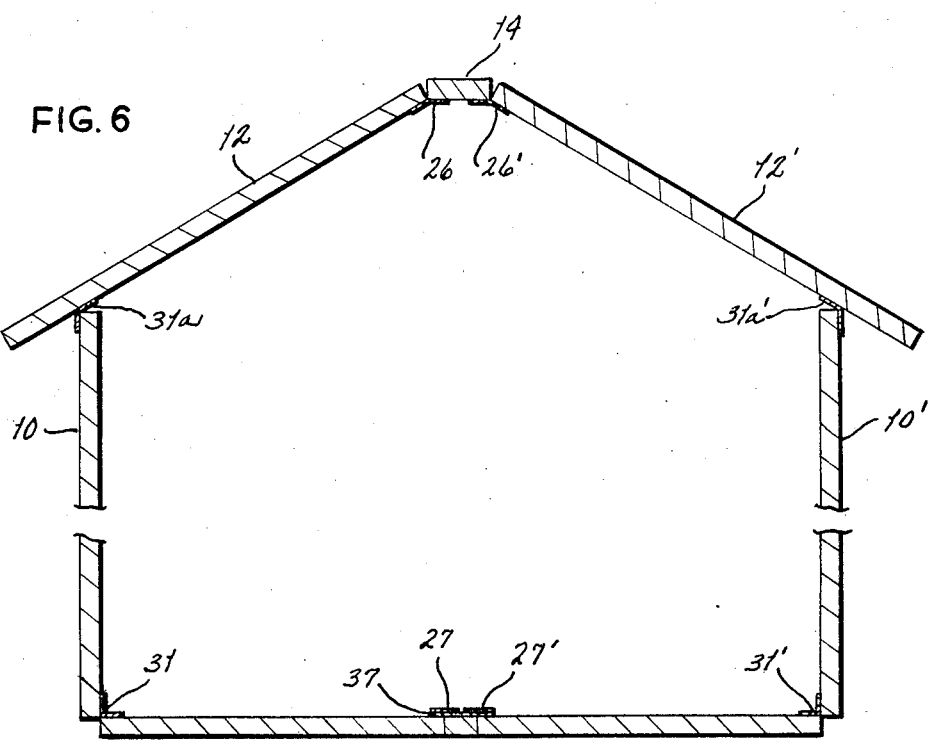

COLLAPSIBLE STRUCTURE

BACKGROUND AND SUMMARY OF THE INVENTION

This invention relates to an improved collapsible structure.

It has been known heretofore to provide collapsible structures for various purposes such as disclosed for example in Hatcher U.S. Pat. No. 3,280,796; the construction there shown includes panels hinged to one another and swingable into appropriate locations, but not exhibiting a capability of being simply lowered to a location and relatively immediately put to use, necessitating instead the relative securement of the various members by fastening means.

Thus also, Webster U.S. Pat. No. 3,807,104 discloses a foldable, portable structure usable as a building, but demonstrating the requirement for separate fastening together of the various elements before use. O'Brian et al U.S. Pat. No. 4,109,427 reveals yet another foldable structure utilizable as an animal shelter but of awkward configuration and providing objectionable outward folding at opposite ends whereby storage space is not effectively conserved in its folded state.

Among the prior art may be noted also the following U.S. Pat. Nos: 3,324,831; 3,332,178; 3,831,337; and 4,195,593.

Accordingly, among the several objects of the invention may be noted the provision of an improved collapsible structure; the provision of such a structure which is extremely easy and convenient to erect without resort to application of fasteners, hooks and eyes, screws and other fastening means, and without requiring separate fastening together of the various elements, thereby providing it to be immediately put to use upon erection; which is just as easily collapsible without unfastening of the various fastening elements heretofore utilized; which is of inherent great strength and relative rigidity when erected, being thus reliable and not prone to damage or collapsing in use; which is of extreme compactness when folded, thereby to permit or facilitate shipping and to reduce cubage during shipment; which is formed of relatively few parts joined together in a strong and effective manner, being reliable and long lasting in usage; and which is easily and economically manufactured; and the provision of such a collapsible structure which is useful as a shelter for animals such as dogs.

Other objects will be in part apparent and in part pointed out hereinbelow.

BRIEF DESCRIPTION OF THE DRAWINGS

FIG. 1 is an entrance end view of a collapsible structure as constructed in accordance with and embodying the present invention.

FIG. 2 is a side elevation view of the construction in FIG. 1.

FIG. 3 is an opposite elevation view thereof.

FIG. 4 is a horizontal cross section taken along line 4—4 of FIG. 2.

FIG. 5 is an enlarged vertical cross section, partly broken away, illustrating a certain locking means of the invention.

FIG. 6 is an enlarged, vertical cross section, partly broken away, taken along lines 6—6 of FIG. 2, with end panels not shown for simplicity.

FIG. 7 is an entrance end elevation view illustrating the new shelter in a partly collapsed state.

FIG. 8 is a simplified, enlarged horizontal cross section taken along line 8—8 of FIG. 7, illustrating the orientation of end and side panels during folding, and with floor panels not being illustrated for simplicity.

Corresponding reference characters indicate corresponding parts throughout the views of the drawings.

DESCRIPTION OF THE PREFERRED EMBODIMENT

Referring now by reference characters to the drawings, illustrated generally at A is the new collapsible structure of the present invention as shown for use as a shelter for dogs or other animals. Shelter A includes opposite side walls 10, 10' across which a saddle-type roof, generally designated 11 is provided, the roof being comprised of flat roof panels 12, 12' hingedly joined to the respective side walls 10, 10', and also hingedly secured together along the peak of the roof by means of a center piece 14 upon which there is provided a lifting handle 15 interconnected with a locking means to be described below, by which the shelter is maintained in its erected condition.

The roof panels 12, 12' extend outwardly over the respective side panels 10, 10' to provide the shelter with eaves 16, 16', as desirable for keeping snow and rain away from the side walls, to protect the shelter from the onslaught of moisture and rain. Thus also, the configuration permits the roof panels 12, 12' to extend well beyond the opposite ends of the shelter, forming gables. The ends of the shelter are similarly constituted by panels hingedly secured not only to the opposite sides 10, 10' but also centrally hinged to permit a folding relationship. Thus, one end is provided with flat end panels, 18, 18' one of which is provided with a vertically elongated opening 19 for ingress and egress of an animal with preferably the opening being located a distance from the lower end of its panel. The opposite end is similarly provided by centrally hinged flat panels 20, 20', neither of which includes an opening. The shelter is provided also with a floor constituted by panels 21, 21', which are joined by a center piece 22 (FIG. 7), hingedly secured to the opposite side panels 10, 10' and also centrally hinged together as illustrated in FIG. 4.

In accordance with the invention, the hinging of the panels is most preferably provided by the use of continuous, extruded strips of synthetic resin material each of which most preferably may have a thin line of weakness along its center line for enhancing flexibility during bending, and each of such strips being secured as by rivets at spaced intervals, adhesive securement or other bonding to the respective panels, which may be formed of wood, fiberglass, PVC, ABS, or various synthetic resin materials, or sheet metal, such as aluminum or galvanized steel. Accordingly, such extruded strips form vertically extending hinges 24, 25 on the exterior of the opposite ends as well, but providing floor and roof hinges, as at 26, 26' along the inside of the roof 11 and also at 27, 27' (FIGS. 6 and 7). Further, the end panels are secured to the side walls by such strips providing hinges interiorly of the shelter, as designated at 29, 29' and 30, 30' (FIGS. 4 and 8). The bottom edges of side wall panels 10, 10' are secured to the corresponding floor panels 21, 21' by interiorly-located strip-form hinges 31, 31', there being upper edge hinges 31a, 31a'.

It will thereby be evident that the hinged relationship of the various roof, floor and side panels is such that the shelter may be collapsed by inward folding of the end panels 18, 18' and 20, 20' along their hinges 24, 25, but outward folding of the roof panels 12, 12' and 21, 21' along the respective hinges.

Locking means is provided for locking the panels in unfolded configuration for maintaining the new shelter in an erected condition. As is shown in FIG. 5, handle 15 is provided by a thin flat strip of wood, sheet metal or synthetic material overlying the upper centerpiece 14 and receiving through holes in its opposite ends lengths of cord 32, 32' which are knotted at intervals and extend through opposite end panels. The cords are sized for each serving as a ligament to be held tight by opposite end knots 33a, 33b when the shelter is erected, and with the handle-remote end of each cord being received in slots 34 provided at the opposite ends of centerpiece 14.

Each such cord also includes intermediate knots at 33c. As the outer cord ends are drawn outwardly by hand, knots 33c cause the end panels to unfold. Stops 36a, 36b are provided at the opposite ends of the bottom and top centerpieces 14, 22 for preventing the end panels 18, 18' and 20, 20' from over-centering so that, when the outer end knots 33a are engaged by the slots 34, the cords 32 will be retained in a tightened condition, resiliently urging the outer end panels in fixed, mutually planar relationship against stops 36a, 36b and thereby keeping the shelter in a reliably secured, erected orientation. The stops 36a, 36b also serve to prevent water from entering the shelter above or below the end panels.

A second, auxiliary locking means is provided in the form of thin sections 37 of hinge material underlying only marginal end portions of the floor panel hinges 27, 27' (FIG. 6) and tending to frictionally tighten the bottom edges of the end panels against the floor panels 21, 21' for assisting in maintaining their mutually planar relationship.

The same locking cords 32 also carry further knots 33d, 33e. For collapsing of the new shelter, the user will disengage the outer knotted ends 33a from slots 34 and pull up by handle 15. Knots 33d will cause the inward folding of the end panels, overcoming the friction resulting from the additional thickness of strips 37 of hinge material upon the floor centerpiece 22, and with the handle being permitted to move upwardly until it draws in the knots 33e and so occupying the position shown in FIG. 7 Upon contact lifting the handle 15, the roof and floor panels continue to fold as shown in FIG. 7, causing further inward folding of the panels (as shown in FIG. 8) until the shelter is completely collapsed.

In its collapsed configuration, the shelter is easily positioned, stored, transported by hand, or stacked conveniently, as with other shelters of the same kind, for shipment or storage.

The structure is easily erected in a desired new location by simply lowering it into place. As the hingedly secured inner edges of the floor panels first contact the surface of the new location, the weight of the shelter will cause the floor panels and the roof panel to unfold, going once more through the orientation shown in FIGS. 7 and 8. Pulling on the outer ends 33a of the cords, the user may then lock the outer end panels in unfolded configuration, as shown in FIGS. 1–5, by pulling these ends up into the slots 34. Accordingly, both collapsing and erecting of the new shelter takes place extremely rapidly and without resort to tools, fastening devices, screws, clasps and the like as heretofore required by prior art constructions, and in an absolute minimum of time but with maximum convenience.

Although a saddle roof configuration is shown, a flat roof can be utilized as well by providing hinged roof panels which, when the structure is erected, will be mutually planar like the floor panels, the roof panels folding outwardly in the same way as the floor panels for collapsing of the new structure. Further, opening 19 is not necessarily confined to a single end panel, but may bridge instead two such panels and may itself be provided with a door or other means for covering the opening.

Though shown for dogs, shelter A can be used for sheltering other animals such as hogs. It may be scaled up or down as desired and used for many different purposes such as a doll house, a bird house, a tool or garden equipment shelter, storage box or building, or even as a garage or other out building or utility building. Accordingly, the new collapsible structure of the invention may be utilized in a variety of ways and for a variety of purposes, being unlimited in its potential and scalable up or down as necessary for fulfilling its intended purpose.

In view of the foregoing, it will be seen that the several objects of the invention and other advantages are achieved by the new constructions which have been described.

Although the foregoing includes the description of the best mode of the embodiments contemplated for carrying out the invention, various modifications are contemplated.

As various modifications could be made in the constructions herein described and illustrated without departing from the scope of the invention, it is intended that all matter contained in the foregoing description or shown in the accompanying drawing shall be interpreted as illustrative rather than limiting.

What is claimed is:

1. A collapsible, easily relocatable structure for erection on a supporting surface, comprising side wall panels, a roof joined to the side wall panels and constituted by a pair of opposed, flat roof panels hingedly joined to the respective side wall panels and hingedly secured centrally, a floor constituted by a pair of flat floor panels hingedly joined to respective lower edges of the side wall panels and including inner edges hingedly secured centrally, opposite ends each comprising a pair of flat end panels hingedly secured to the side wall panels and hingedly secured centrally, and characterized by the structure being collapsible by outward folding of the roof panels, inward folding of each of the pairs of end panels, and outward folding of the floor panels with the hingedly secured inner edges of the floor panels extending beyond and below the side wall lower edges for first contacting the supporting structure when the collapsed structure is lowered to the supporting surface, and means for locking the panels in unfolded configuration for maintaining the shelter in an erected condition.

2. A collapsible structure according to claim 1 and further characterized by the means for locking the panels in unfolded configuration providing securement of the end panels in mutually planar relationship.

3. A collapsible structure according to claim 2 and further characterized by the locking means comprising ligaments at opposite ends of the shelter for pulling the end wall panels outwardly into said mutually planar relationship.

4. A collapsible structure according to claim 3 and further characterized by the locking means also comprising means carried by the floor panels for frictionally engaging lower edges of the end wall panels for assisting in maintaining the end wall panels in mutually planar relationship.

5. A collapsible structure according to claim 2 and further characterized by the roof panels extending outwardly beyond the side wall panels to form eaves and outwardly beyond the end wall panels to form gables.

6. A collapsible structure according to claim 2 and further characterized by the roof panels being centrally formed by a roof centerpiece to which the roof panels are both hinged, the centerpiece including at least one handle for lifting, of the shelter for transporting same in a collapsed configuration, the roof centerpiece forming a roof ridge.

7. A collapsible structure according to claim 1 and further characterized by the roof, floor and end wall panels being secured to the respective side wall panels by stripform bendable hinges.

8. A collapsible structure according to claim 1 and further characterized by the roof and floor each including respective elongated, thin centerpieces, the roof panels being centrally secured to the roof centerpiece by a pair of strip-form bendable hinges, the floor panels being centrally secured to the floor centerpiece by a further pair of strip-form bendable hinges.

9. A collapsible structure according to claim 1 and further characterized by the roof panels being of sloping orientation to provide a roof of saddle configuration including a roof ridge.

10. A collapsible structure according to claim 1 for use as an animal shelter for dogs or other animals, at least one of the end wall panels having an opening for animal ingress and egress.

11. A collapsible, easily relocatable structure comprising side wall panels, a roof joined to the side wall panels and constituted by a pair of opposed, flat roof panels hingedly joined to the respective side wall panels and hingedly secured centrally, a floor constituted by a pair of flat panels hingedly joined to the side wall panels and hingedly secured centrally, opposite ends each comprising a pair of flat end panels hingedly secured to the side wall panels and hingedly secured centrally, and characterized by the structure being collapsible by outward folding of the roof panels and inward folding of the end panels, and means for locking the panels in unfolded configuration for maintaining the shelter in an erected condition, the means for locking the panels in unfolded configuration providing securement of the end panels in mutually planar relationship and comprising ligaments at opposite ends of the shelter for pulling the end wall panels outwardly into said mutually planar relationship, the roof including a roof centerpiece to which the roof panels are centrally hingedly secured, the roof centerpiece including a handle for lifting the shelter, the ligaments each having an inner end affixed to the roof centerpiece, the ligaments each extending through a corresponding end wall panel at opposite ends of the shelter and each including means for engaging such corresponding end wall panel for urging it outwardly, the roof centerpiece including means at its outer ends for fixedly engaging the outer end of each ligament for thereby maintaining the erected condition of the structure.

12. A collapsible structure according to claim 11 and further characterized by the handle being affixed to the inner ends of the ligaments and being moveable by lifting away from the roof centerpiece for pulling the outer ends of the ligaments inwardly, the ligaments each including means for engaging its corresponding end wall panel for urging it inwardly whereby, when the outer ends of the ligaments are disengaged from the outer ends of the roof centerpiece, ligting of the handle causes the end wall panels to be pulled inwardly for collapsing of the structure.

* * * * *

UNITED STATES PATENT AND TRADEMARK OFFICE
CERTIFICATE OF CORRECTION

PATENT NO. : 4,603,658

DATED : August 5, 1986

INVENTOR(S) : Mr. Roger L. Garnsey

It is certified that error appears in the above-identified patent and that said Letters Patent is hereby corrected as shown below:

Column 6, claim 12, line 9, "ligting" should be ---lifting---.

Signed and Sealed this

Twenty-eighth Day of October, 1986

[SEAL]

Attest:

DONALD J. QUIGG

*Attesting Officer*  *Commissioner of Patents and Trademarks*